Oct. 20, 1970   E. W. MADSEN ET AL   3,535,604
ELECTRIC STEPPING MOTOR

Filed June 14, 1968   3 Sheets-Sheet 1

INVENTORS
Elmer W. Madsen
Hermann Rosshirt
BY
Johnson and Kline
ATTORNEYS

Oct. 20, 1970  E. W. MADSEN ET AL  3,535,604
ELECTRIC STEPPING MOTOR
Filed June 14, 1968  3 Sheets-Sheet 2
Fig. 3
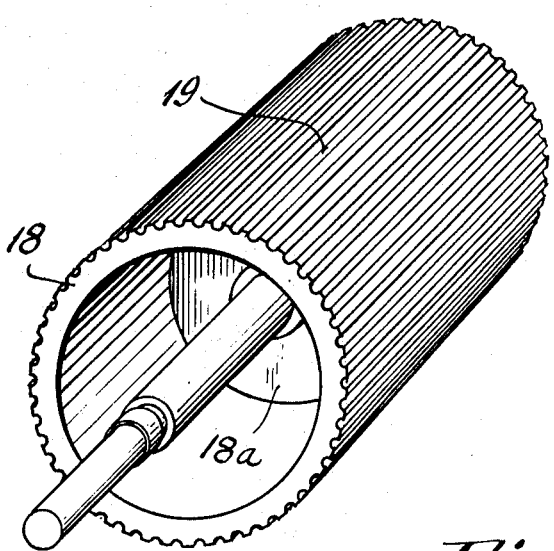
Fig. 4
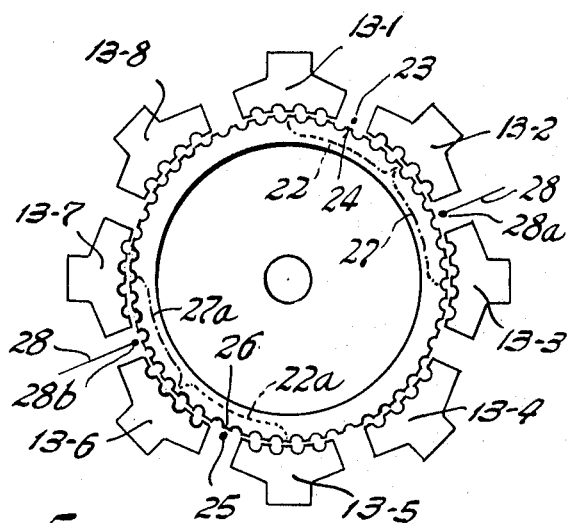
Fig. 5
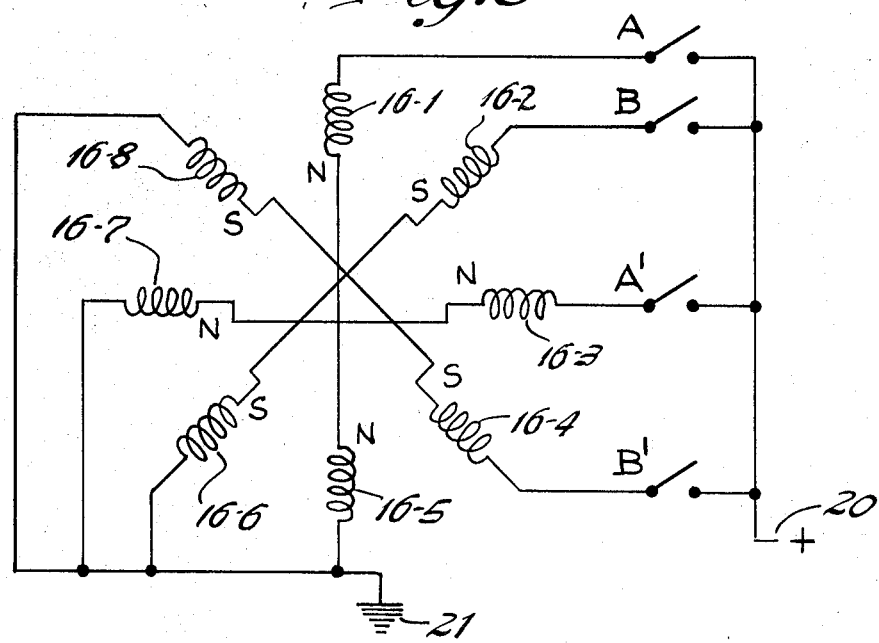
Fig. 6
| STEP | FORWARD | REVERSE |
|------|---------|---------|
| 1 | A B | A B |
| 2 | A' B | A B' |
| 3 | A' B' | A' B' |
| 4 | A B' | A' B |
| 1 | A B | A B |
| 2 | A' B | A B' |
INVENTORS
Elmer W. Madsen
Hermann Rosshirt
BY
Johnson and Kline
ATTORNEYS

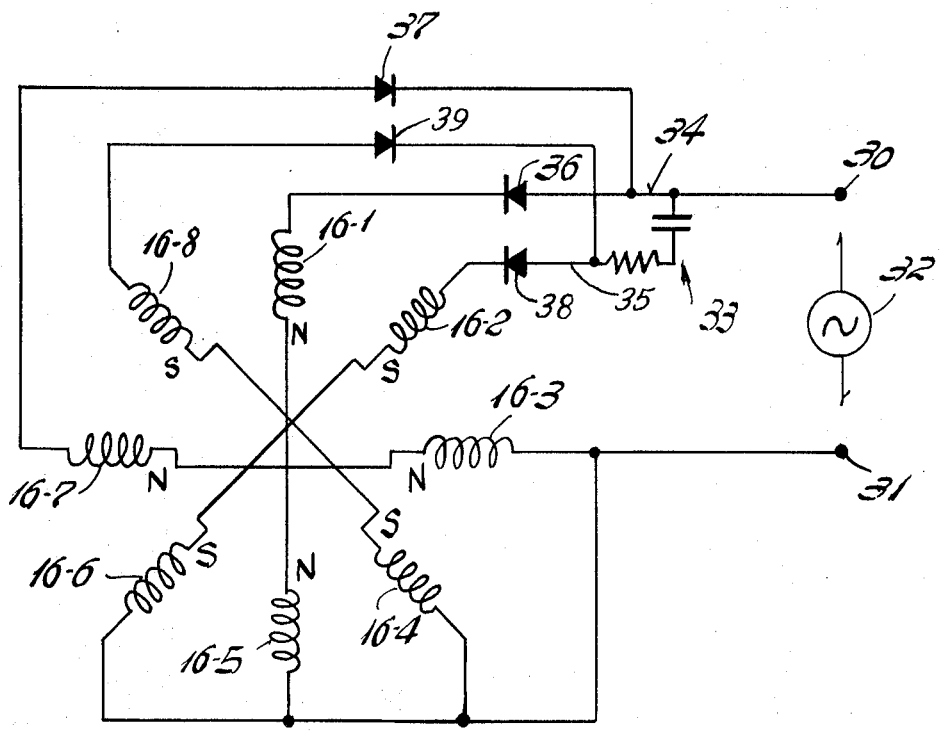

United States Patent Office 3,535,604
Patented Oct. 20, 1970

3,535,604
ELECTRIC STEPPING MOTOR
Elmer W. Madsen and Hermann Rosshirt, Bristol, Conn.,
   assignors to The Superior Electric Company, Bristol,
   Conn., a corporation of Connecticut
         Filed June 14, 1968, Ser. No. 737,191
                  Int. Cl. H02k 37/00
U.S. Cl. 318—138                                     4 Claims

ABSTRACT OF THE DISCLOSURE

A stepping motor of the synchronous inductor type having a toothed rotor which cooperates with a stator having a plurality of poles with the poles also being toothed. The motor is stepped by magnetizing at least one pair of adjacent poles with the poles having opposite magnetic polarity and then sequentially changing the pair of poles that are magnetized to another pair with each pole always being magnetized to have the same polarity so that the flux path of the stator flux is from one pole through only the peripheral portion of the rotor to the other pole.

---

The herein disclosed motor is of the type which produces an incremental movement of the rotor for each change in energization or magnetization of the stator poles with the rotor synchronously following the changing stator magnetization. The rate of the stator changes of energization controls the speed of the motor. The rotor is inductively associated with the stator and hence the motor is of the stepping, synchronous inductor type. However, as the stator and rotor are toothed, a full sequence of stator pole changes of energization will not produce a complete rotation of the rotor but only a rotor movement which is related to the pitch of the rotor teeth.

In U.S. Pat. No. 3,148,319 assigned to the assignee of the present invention there is disclosed a similar stepping motor which has a toothed stator and rotor. The stator poles are sequentially magnetized and magnetically attract the rotor teeth to produce stepping movements. The path of the flux for one kind of stepping operation is from one pole diametrically through the rotor to the opposite pole. This is the basic flux path even for a different kind of stepping condition (when more poles are magnetized) but yet there may be a flux path of the stator flux from one pole through the periphery of the rotor to an adjacent pole. The existence of a possible variation in the flux path for a step in a series of steps is believed to be the reason why the incremental movement of the rotor for each change in energization is not identical which prevents each step from moving a substantially exact and constant length. Moreover, it has been found that there is a tendency for this type of motor to resonate at certain speeds which if the motor is wanted to operate at such a speed seriously interferes with its performance.

It is accordingly an object of the present invention to provide a stepping motor of the synchronous inductor type in which the flux path for each step is constant and produces a substantially exact constant length step.

Another object of the present invention is to provide in the above type of motor for a flux path for the stator flux which for all operating conditions of the motor only includes the peripheral portions of the rotor and hence does not diametrically pass through the rotor.

A further object of the present invention is to achieve the above objects and yet provide a stepping motor which is extremely resistant to resonating, has a low inertia rotor without a permanent magnet so as to be able to have a comparatively high stepping speed and also one which is relatively economical to manufacture.

In carrying out the present invention, the electric stepping motor herein described includes a stator that has a plurality of poles, herein specifically eight, with each pole having its inner periphery toothed. A winding is inductively associated with each pole and upon its energization will magnetize the pole so that all the pole's teeth will be of the same magnetic polarity.

The rotor has an annular portion formed of high permeable material with axially extending peripheral teeth and is substantially axially coextensive with the stator. Flux produced by a stator pole passes through an air gap between the stator and rotor to the rotor and again through the air gap to an oppositely magnetized stator pole so that the teeth of the rotor tend to align themselves with the teeth of the magnetized poles. As the windings of the poles are sequentially energized and deenergized, the alignment follows the pairs of magnetized poles to produce the stepping, rotational movement.

There are at least four poles with the winding of each pole being separately energizable and with the energizing of the winding always causing its pole to have the same magnetic polarity. If, as herein disclosed the motor has eight poles then, for convenience, the windings of diametrically opposite poles may be connected together to form a winding set. Thus, for an eight pole motor, there are four winding sets. When a set is energized by direct current both poles of the set are caused to assume the same magnetic polarity. In addition an adjacent set is similarly constructed so that energization of its windings will produce the same magnetic polarity in both of its poles but the polarity of the latter will be opposite from the former. Thus with four of the eight poles energized, i.e. two winding sets forming two pairs of adjacent poles, magnetic flux will pass from one pole of one set to the other pole of the other set and also from the other pole of the one set to the adjacent pole of the other set. In both instances the flux just passes through the peripheral portions of the rotor providing an extremely short path for the flux and the rotor teeth will attempt to align themselves with the magnetized poles to provide the path of least reluctance. By next energizing the third set of windings, while deenergizing the one, there will still be adjacent poles that have opposite magnetic polarities and the rotor will again attempt to align its teeth with those of the magnetized poles, thus producing an incremental movement from the previous position.

Other features and advantages will hereinafter appear.

In the drawing:

FIG. 3 is a perspective view of the rotor.

FIG. 4 is a diagrammatic representation of the rotor and stator poles.

FIG. 5 is an electrical schematic diagram of a circuit for energizing the stator pole windings from a D.C. source.

FIG. 6 is a table indicating the sequence of energization of the different poles to produce forward and reverse movement.

FIG. 7 is an electrical schematic diagram of a circuit for energizing the motor from an A.C. source.

Figure 1:
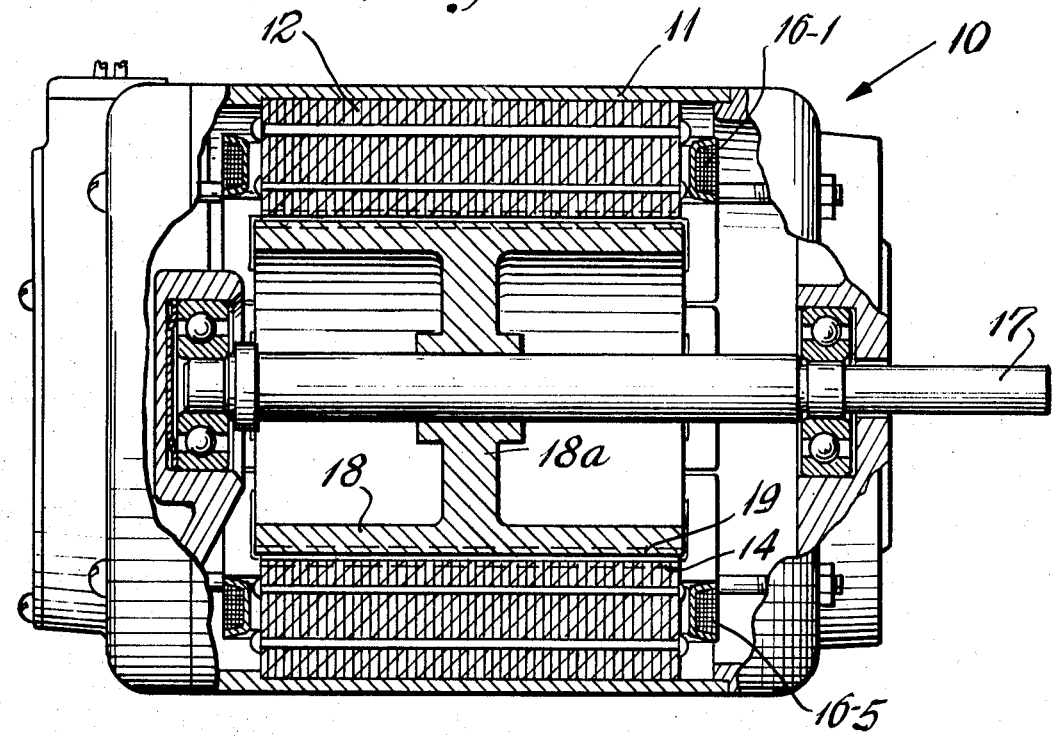
FIG. 1 is a side view of the motor shown partly in axial section and with portions removed to show an axial section.
Figure 2:
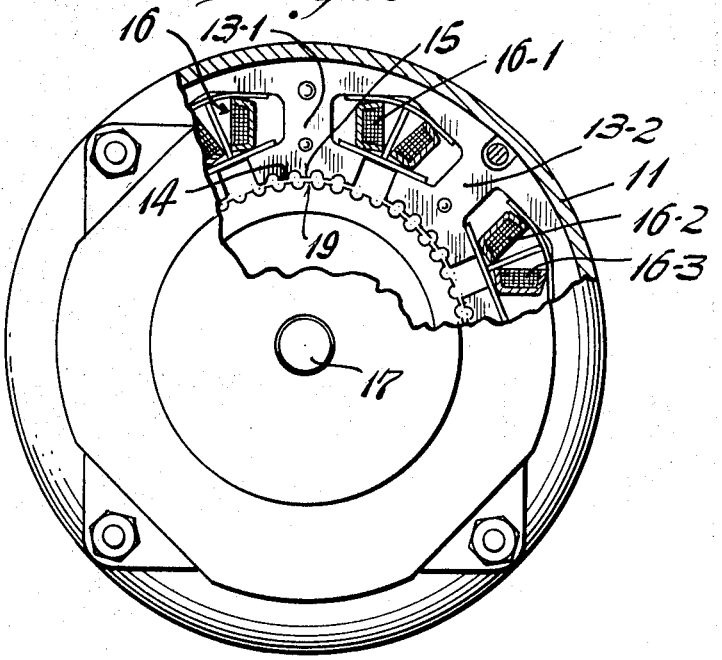
FIG. 2 is an end view also with portions broken away.

Referring to the drawing, the motor of the present invention is generally indicated by the reference numeral 10 and includes a housing 11. Within the housing there is secured a stator 12 formed of secured together thin laminations of permeable iron. As shown in FIG. 2, the stator laminations are each identical and formed to provide a plurality of inwardly projecting poles 13–1, 13–2 through 13–8 (as the herein specifically described embodiment has eight poles). Each pole has an arcuate periphery 14 that is formed with equally spaced teeth 15 that extend radially inwardly and axially along the pole periphery. A winding 16 encircles a pole for effecting magnetization thereof when energized and thus there are windings 16–1 through 16–8 inclusive.

The housing 11 supports a rotor for rotational movement with the rotor including a shaft 17 on which is mounted a rotating member 18 that is essentially annular and is secured to the shaft by a web 18a. The periphery of the rotating member is formed with radially outwardly extending and axially elongate rotor teeth 19. The member 18 is of a length which is substantially coextensive with the length of the stator pole peripheries and designed to rotate therewithin with a slight air gap therebetween.

Referring to FIGS. 4 and 5, there are shown poles 13–1 through 13–8 and windings 16–1 through 16–8 with a winding and its associated poles having the same terminal number in their reference numeral. In FIG. 4 poles 13–1 through 13–8 are positioned to be equally spaced about a circle and for ease of explanation each pole's winding in FIG. 5 has the same relative position. The windings 16–1 and 16–5 are connected together in series between a positive source of electrical energy 20 and a ground 21. A switch A controls the energization of these windings and when they are energized by the switch being closed, the windings are so wound and connected that they will magnetically polarize their associated poles 13–1 and 13–5 to be N poles. Similarly the windings 16–3 and 16–7 are connected together to form a winding set and are energizable through a switch A'. When they are energized, their associated poles 13–3 and 13–7 are caused also to be N poles.

For the other windings 16–2 and 16–6 and 16–4 and 16–8 they are respectively connected through switches B and B'. Energization of these windings will cause their associated poles to be S poles.

While manually operable switches A, B, A' and B' have been described, the present invention contemplates the use of an automatic switching circuit to provide the sequence of energization of the windings set forth in the table in FIG. 6 in order to produce the incremental rotation. One particular form of automatic switching circuitry is shown in U.S. Pat. No. 3,117,268. The presently described motor is capable of being usable directly with such a circuit without alteration of the circuit and is capable of being operated thereby at relatively high speeds up to and beyond 1000 steps per second.

In the operation of the motor, the switches A and B are both initially closed as set forth in the first step of the table, FIG. 6. Referring to FIG. 4, this step renders the poles 13–1 and 13–5 N poles and 13–2 and 13–6 S poles. A flux path is established as indicated by a dotted line 22 between the poles 13–1 and 13–2 through the annular periphery of the rotating member and a similar flux path 22a is produced in the periphery of the rotating member between the poles 13–5 and 13–6. The teeth of the rotating member will attempt to align themselves with the teeth of the poles so as to form the lowest reluctance flux path between the stator and the rotor teeth through the air gap therebetween. The rotor teeth opposite the poles 13–1 and 13–2 will be slightly mismated with respect to the pole teeth so that if a tooth existed at the point 23 between the two poles 13–1 and 13–2 there would be exact alignment with a rotor tooth 24. Similarly diametrically oppositely, if a stator tooth was positioned at the point 25 between the poles 13–5 and 13–6 a rotor tooth 26 would be in exact alignment therewith.

It will be understood that in this embodiment of the motor, the rotor tooth pitch and the stator tooth pitch are somewhat different, i.e. 50 and 48 respectively so that there cannot be full alignment of all teeth. Moreover, the stator poles are separated by two spaces and one tooth of the stator tooth pitch so that in effect one tooth has been eliminated from the stator between poles. If desired, the tooth pitches could be equal but the poles arcuately spaced about the rotor periphery to provide places of non-alignment and alignment between the rotor and stator pole teeth.

For the next step assuming a forward direction is desired, switch A is opened and switch A' is closed causing the flux path indicated by the dotted line 27 to occur between the poles 13–2 and 13–3 and another flux path 27a to occur between the poles 13–6 and 13–7. The theoretical exact alignment between a stator tooth and a rotor tooth will occur along the diameter line 28 at the points 28a and 28b. The motor will have advanced one-quarter of a rotor tooth pitch.

The next sequence of energization for forward movement is to maintain the switch A' closed, open the switch B and close the switch B' which will produce theoretical exact tooth alignment between the energized poles 13–3 and 13–4 and 13–7 and 13–8, advancing the rotor another quarter of a tooth pitch. The next change of energization to effect the fourth step and then the first step again will complete the sequence of the energization of the winding sets to produce a total rotational movement equivalent to the arcuate distance of one rotor tooth pitch in four distinct seps.

In the above described operation of the motor only two winding sets are energized at each step and that adjacent poles of each winding set are magnetized of the opposite polarity. The flux path is just through the peripheral portion of the rotating member 18 without extending diametrically through the rotor for all steps. Accordingly, the rotating member at all stepping positions will have effectively the same torque applied thereto and will move a constant increment.

It has been found that the present motor is capable of having a faster stepping speed without any substantial decrease in torque over a similar motor utilizing a permanent magnet. Moreover, by reason of the flux path for every step being constantly through the periphery of the rotor member a smoother and more constant operation is achieved thereby obviating the possibility of resonance occurring at any particular speed. It will also be noted that the rotating member is made relatively light by the rotor not requiring a solid member of permeable material and could even have the hub 18a be made of light non-magnetic material such as aluminum. The substantial decrease in the weight of the rotating member will increase the torque to inertia ratio and hence stepping response of the motor. The particular width or thickness of the annular part 18 may also be relatively thin but should be of a thickness which is capable of carrying the flux from one pole to the adjacent pole without becoming saturated. Also, if desired, the rotating member length is capable of being extended, as is the stator length, to increase the power capability of the motor.

A further advantage which the present motor attains is the obviating of the necessity of having a pole be magnetized initially of one polarity and then another. Each pole is magnetized whenever its winding is energized to be of the same magnetic polarity by always having unidirectional current flowing in the same direction through the winding.

The motor also provides a brake or stopping if the energizations of the winding are not changed at the last step taken, and thus may also be stopped and braked just by ceasing the changes of energization.

As schematically shown in FIG. 7, the motor may be energized from an A.C. source if desired. The motor thus has the same winding 16–1 through 16–8 which will magnetize their associated poles of the same magnetic polarity and which have windings of opposite poles serially connected. A pair of terminals 30 and 31 are adapted to be connected to an A.C. source 32 to provide through a phase shifting circuit 33 a first phase A.C. on a lead 34 and a second phase A.C. on a lead 35. The two phases are spaced essentially 90 degrees apart. Diodes 36 and 37 are connected in the direction shown to lead 34 and windings 16–1 and 16–5 and 16–3 and 16–7 respectively while diodes 38 and 39 are connected in the direction shown to lead 35 and windings 16–2 and 16–6 and 16–4 and 16–8. The terminal 31 is connected to the other ends of the windings.

With this construction, the motor will rotate at a speed related to the frequency of the A.C. source 31. Thus, considering the terminal 30 as positive, windings 16–1 and 16–5 will be energized as will windings 16–2 and 16–6 but the other windings will not be energized. For the condition where the terminal 31 is positive, the other windings will be energized but not 16–1, 16–5, 16–2 and 16–6. As the phase shifting circuit 33 energizes windings 16–2 and 16–6 and 16–4 and 16–8 one-half a cycle out-of-phase from the windings connected to the lead 34, the windings 16–2 and 16–6 will be maintained energized when the terminal 30 shifts from positive to minus and until the windings 16–3 and 16–7 become fully energized. Then the windings 16–4 and 16–8 become energized and are maintained energized while the windings 16–1 and 16–5 become energized and the windings 16–3 and 16–7 become deenergized.

The particular circuit shown will effect clockwise rotation of the rotor. For counterclockwise rotation, the leads 34 and 35 are interchanged with respect to the terminal 30 so that the lead 35 will then be in phase with the A.C. source 32 and the lead 34, 90 degrees out of phase.

It will accordingly be appreciated that there has been disclosed a stepping motor of the synchronous inductor type which has a stator formed of poles having teeth and a toothed rotor. The flux path of the flux of the stator poles is always from one pole to an adjacent pole and includes just the periphery of the rotor adjacent the magnetized poles. By such a relationship, the motor is much less susceptible to resonating and is capable of higher stepping speeds than motors which have a varying flux path.

Variations and modifications may be made within the scope of the claims and portions of the improvements may be used without others.

We claim:

1. A stepping motor of the synchronous inductor type comprising an annular stator having a plurality of equally spaced, radially inwardly extending poles, the inner periphery of each pole being formed with a plurality of equally spaced teeth, a winding inductively associated with each pole for magnetizing said pole upon energization of its winding, a rotor rotatably mounted within the stator and having an annular portion of permeable material positioned in radial alignment with the stator poles and having a periphery formed with equally spaced teeth with there being more rotor teeth than stator poles, said rotor teeth being closely juxtaposed to the teeth of the poles and spaced therefrom by an air gap, means providing unidirectional current for energizing one winding to have its pole be of one magnetic polarity and for energizing the winding of an immediately adjacent pole to have its pole have the opposite magnetic polarity whereby the flux produced by the magnetized poles passes from the one pole to the adjacent pole through the annular portion of the rotor and the air gaps, there being a toothed portion of the rotor having more than one tooth positioned radially opposite each magnetized pole to define the air gap therebetween with the flux passing radially through the air gap between the toothed portions and the poles with each portion tending to align itself with its opposite magnetized pole to effect a flux path of minimum reluctance, and in which each winding is always energized by the means for energizing to produce the same magnetic polarity of its associated pole, with the windings of at least some poles being deenergized when the adjacent poles are magnetized.

2. The invention as defined in claim 1 in which the poles are located to provide diametrically opposite poles, means for connecting the windings of diametrically opposite poles into a winding set together to be simultaneously energized, and in which the poles of each winding set are magnetized by their windings to have the same magnetic polarity.

3. The invention as defined in claim 2 in which there are two winding sets forming a first group, two winding sets forming a second group, the means for energization alternately energizes the winding sets of each group, in which the same winding set of one group is maintained energized when the energizing of the winding sets of the other group is being altered, and in which the means for energizing energizes only one winding set in each group at a time.

4. The invention as defined in claim 3 in which the means for energizing causes the winding of the first group to always effect magnetization of their associated poles to have the same magnetic polarity and the windings of the second group of winding sets to effect magnetization of their associated poles of the other magnetic polarity.

References Cited

UNITED STATES PATENTS

| | | | |
|---|---|---|---|
| 3,148,319 | 9/1964 | Fredrickson | 310—49 XR |
| 3,375,421 | 3/1968 | Venard | 310—49 XR |
| 3,428,837 | 2/1969 | Morreale et al. | 310—49 |
| 3,430,083 | 2/1969 | O'Regan | 310—49 |
| 3,437,854 | 4/1969 | Oiso | 310—49 |

GLEN SIMMONS, Primary Examiner

U.S. Cl. X.R.

310—49; 318—18